(12) United States Patent
Thambiratnam et al.

(10) Patent No.: US 9,369,660 B2
(45) Date of Patent: Jun. 14, 2016

(54) EMBEDDING CONTENT-BASED SEARCHABLE INDEXES IN MULTIMEDIA FILES

(75) Inventors: Albert J. K. Thambiratnam, Beijing (CN); Frank Torstein Seide, Beijing (CN); Roger Peng Yu, Beijing (CN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1217 days.

(21) Appl. No.: 13/325,261

(22) Filed: Dec. 14, 2011

(65) Prior Publication Data

US 2012/0096007 A1  Apr. 19, 2012

Related U.S. Application Data

(63) Continuation of application No. 11/581,320, filed on Oct. 16, 2006, now Pat. No. 8,121,198.

(51) Int. Cl.

| | |
|---|---|
| *H04N 7/12* | (2006.01) |
| *H04N 5/76* | (2006.01) |
| *G06F 17/30* | (2006.01) |
| *G11B 27/28* | (2006.01) |
| *H04N 5/765* | (2006.01) |
| *H04N 5/781* | (2006.01) |
| *H04N 5/85* | (2006.01) |
| *H04N 5/907* | (2006.01) |
| *H04N 5/91* | (2006.01) |
| *H04N 9/82* | (2006.01) |

(52) U.S. Cl.
CPC ............ *H04N 5/76* (2013.01); *G06F 17/30781* (2013.01); *G11B 27/28* (2013.01); *H04N 5/765* (2013.01); *H04N 5/781* (2013.01); *H04N 5/85* (2013.01); *H04N 5/907* (2013.01); *H04N 5/91* (2013.01); *H04N 9/8205* (2013.01)

(58) Field of Classification Search
CPC .... G06F 17/30781; G11B 27/28; H04N 5/76; H04N 5/765; H04N 7/781; H04N 5/91; H04N 9/8205
See application file for complete search history.

(56) References Cited

U.S. PATENT DOCUMENTS

| | | | |
|---|---|---|---|
| 5,655,117 A | 8/1997 | Goldberg et al. | |
| 5,781,906 A * | 7/1998 | Aggarwal | ......... G06F 17/30327 |
| 6,377,995 B2 | 4/2002 | Agraharam et al. | |
| 6,675,174 B1 | 1/2004 | Bolle et al. | |
| 6,714,909 B1 | 3/2004 | Gibbon et al. | |
| 6,782,049 B1 * | 8/2004 | Dufaux | ............. G06F 17/30802 |
| | | | 348/700 |

(Continued)

OTHER PUBLICATIONS

Benitez, et al., "Object-based multimedia content description schemes and applications for MPEG-7". Http://www.ctr.columbia.edu/papers_advent/00/ICJ00_ana.pdf. 2000, 35 pages.

(Continued)

*Primary Examiner* — Nhon Diep
(74) *Attorney, Agent, or Firm* — Steve Wight; Sandy Swain; Micky Minhas

(57) ABSTRACT

Content-based analysis is performed on multimedia content prior to encoding the multimedia content in the rendering chain of processing. A content-based index stream is generated based on the content-based analysis and the content-based index stream is embedded in the multimedia file during rendering. The content-based index stream can be used to generate a content-based searchable index when necessary.

7 Claims, 9 Drawing Sheets

(56) References Cited

U.S. PATENT DOCUMENTS

| | | | |
|---|---|---|---|
| 6,877,010 B2 | 4/2005 | Smith-Semedo et al. | |
| 7,751,632 B2* | 7/2010 | Liu | G06K 9/00771 382/236 |
| 7,877,774 B1 | 1/2011 | Basso et al. | |
| 8,121,198 B2 | 2/2012 | Thambiratnam et al. | |
| 2002/0157116 A1 | 10/2002 | Jasinschi | |
| 2004/0125877 A1 | 7/2004 | Chang et al. | |
| 2004/0168205 A1 | 8/2004 | Nesvadba et al. | |
| 2005/0021512 A1 | 1/2005 | Koenig | |
| 2005/0086254 A1 | 4/2005 | Zou et al. | |
| 2005/0097451 A1 | 5/2005 | Cormack et al. | |
| 2005/0097470 A1 | 5/2005 | Dias et al. | |
| 2006/0087987 A1 | 4/2006 | Witt et al. | |
| 2006/0136981 A1 | 6/2006 | Loukianov | |
| 2006/0159429 A1* | 7/2006 | Sugahara | G11B 20/1217 386/209 |

OTHER PUBLICATIONS

Chang, et al. "Multimedia Search and Retrieval" Date: 1999, http://userpages.umbc.edu/-nikunj1/survey/chapeter-99.pdf, 28 pages.

Dittmann et al. "Combined video and audio watermarking: Embedding content information in multimedia data" ftp://ftp.kom.e-technik.tu-darmstadt.de/pub/papers/DSR+00-1-paper.ps.gz, 2000, 11 pages.

Smoliar et al. "Content-Based Video Indexing and Retrieval" Date: 1994, http://ieeexplore.ieee.org/iel4/93/7557/00311653.pdf?isNumber. 12 pages.

Kiranyaz, et al. "MUVIS: A Content-Based Multimedia Indexing and Retrieval Framework", 2003, IEEE, Institute of Sinai Processing, Tampere University of Technology, Tampere, Findland, 8 pages.

Chabane Djeraba, "Content-Based Multimedia Indexing and Retrieval", 2002 IEEE. 5 pages.

G. Qui, Pattern Colour Separable Image Coding for Content Based Indexing, 1999, Scholl of Computing & Mathematics, The University of Derby, Berby DE22, IGB, United Kingdom, pp. 407-412.

Prosecution History for U.S. Appl. No. 11/581,320 including: Issue Notification dated Feb. 1, 2012, Notice of Allowance dated Sep. 19, 2011, Amendment dated Jul. 14, 2011, Office Action dated Jun. 22, 2011, Respones to Restriction Requirement dated Apr. 8, 2011, Requirement for Restriction dated Mar. 30, 2011 and Application and Drawing filed Oct. 16, 2006, 61 pages.

\* cited by examiner

```
.
.
.
<segment start=s1 end=e1>
   ... [stream segment data]
</segment>
<segment start=s2 end=e2>
   ... [stream segment data]
</segment>
.
.
.
```

FIG. 7

```
<segment start=1.52 end=5.39>
   <word label=this t=0.06>
   <word label=is t=0.45>
   <word label=bill t=0.82>
   <word label=johnson t=1.31>
   <word label=bringing t=1.91>
   <word label=you t=2.20>
   <word label=the t=2.43>
   <word label=latest t=2.94>
   <word label=breaking t=3.62>
</segment>
```

FIG. 8

```
<segment start=1.52 end=5.39>
  <word label=this t=0.06 p=0.40>
  <word label=is t=0.45 p=0.70>
  <word label=bill t=0.82 p=0.90>
  <word label=johnson t=1.31 p=0.60>
  <word label=bringing t=1.91 p=0.50>
  <word label=you t=2.20 p=0.80>
  <word label=the t=2.43 p=0.40>
  <word label=latest t=2.94 p=0.70>
  <word label=breaking t=3.62 p=0.50>
</segment>
```

EMBEDDING CONTENT-BASED SEARCHABLE INDEXES IN MULTIMEDIA FILES

The present application is a continuing of and claims priority of U.S. patent application Ser. No. 11/581,320, filed Oct. 6, 2006, the content of which is hereby incorporated by reference in its entirety.

BACKGROUND

Many consumers currently have access to vast collections of multimedia content, such as audio and video files, through wide area networks, such as the Internet and through digital media centers. There is also a scarcity of tools that consumers can use to easily manage and search such collections. In particular, tools for performing content-based indexing and then content retrieval based on a generated index, for multimedia content, is an ongoing challenge.

Most multimedia content is generated by taking a set of source tracks (such as audio, video or text tracks), applying a set of rendering transforms such as special effects, mixing, fading and text overlay, and then saving the resulting rendered content to a single output multimedia file. The output multimedia file is currently in one of a variety of container formats. Some popular container formats include ASF, MPG, MP3, MP4, WAV and OGG formats. Most of these container file formats support the inclusion of multiple coded streams, including video streams, audio streams and text (e.g., subtitle) streams.

Some current approaches to performing content-based indexing and retrieval involve the use of speech recognition, audio scene analysis and video scene analysis. Speech recognition is employed in an attempt to generate some type of transcription of speech in audio files that can be used for indexing. Audio scene analysis involves analyzing audio content of a multimedia file (other than speech or including speech) to generate scene descriptions that can be used in indexing. Video scene analysis involves employing various types of recognition algorithms to recognize video components that can be used in indexing.

Although the accuracies in each of these technologies are slowly approaching levels that are considered useful in indexing, wide spread use of these technologies has been hindered for a number of reasons. The high acoustic and visual complexity of many multimedia files can result in poor index quality. For instance, speech recognition error rates are much higher when recognizing audio files that have background music or sound effects added to them.

The large amount of computing required to perform content-based indexing has also been problematic. Currently, the processing power required is at least an order of magnitude higher than the processing required for text-based indexing. This has hindered searching for speech content using speech recognition in Internet search engines since the processing power required to index all the audio and video content on the internet is enormous. It has also limited the use of similar technologies for desktop search functions since execution of such functions drains CPU processing availability and interferes with the user's ability to use the desktop computer.

Similarly, this type of indexing has conventionally been employed on encoded multimedia files. When indexing is performed at that stage in production of the multimedia content, a relatively large amount of useful information is lost before the indexing analysis is performed. For instance, video compression and audio compression are conventionally performed on multimedia files and lower the quality of the files. This lower quality makes it difficult to perform content-based analysis for indexing.

As a result of these problems, a common current approach to indexing multimedia files is to simply index support metadata. For instance, some current systems index metadata such as file names and any other accompanying textual descriptions found in the metadata. Of course, this type of metadata indexing is very limited and thus hinders the quality of the index generated and the quality of content retrieval performed by searching against the index.

The discussion above is merely provided for general background information and is not intended to be used as an aid in determining the scope of the claimed subject matter.

SUMMARY

Content-based analysis is performed on multimedia content prior to encoding the multimedia content in the rendering chain of processing. A content-based index stream is generated based on the content-based analysis, and the content-based index stream is embedded in the multimedia file during rendering. The content-based index stream can be searchable itself or it can be used to generate a different content-based searchable index.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 7 is one illustrative embodiment of an environment in which a content-based index stream can be generated.

FIG. 8 is a flow diagram illustrating one embodiment of the operation of the system shown in FIG. 7.

DETAILED DESCRIPTION

Figure 1:
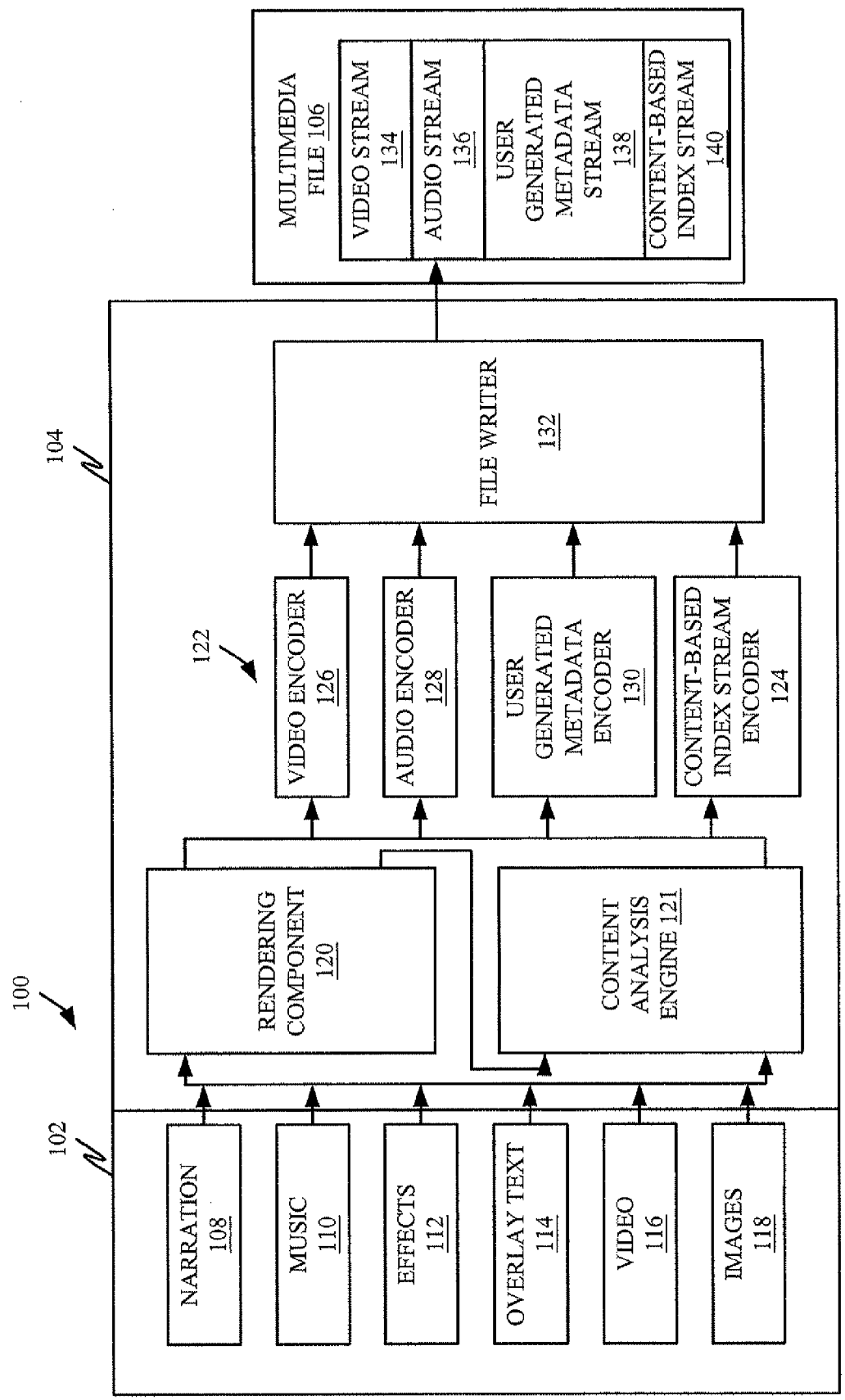
FIG. 1 is a block diagram of one illustrative embodiment of a multimedia file generation system.

FIG. 1 shows a multimedia file generation system 100 in accordance with one embodiment. System 100 includes editor 102 and renderer 104. System 100 also shows that renderer 104 provides a multimedia file 106 at its output. In the embodiment shown in FIG. 1, editor 102 receives a plurality of source tracks from suitable input devices. The source tracks shown in FIG. 1 are exemplary only and include narration 108, music 110, special effects 112, overlay text 114, video 116 and images 118. In generating a multimedia file 106, all of these various types of inputs, or different inputs or additional inputs, may be provided through editor component 102.

The source tracks are provided to rendering engine 120 and content analysis engine 121 in renderer 104. Rendering engine 120 applies a set of rendering transforms, such as the special effects, mixing, fading, and text overlay, to the source tracks and provides the transformed source tracks to a set of encoders 122. Encoders 122 illustratively include video encoder 126, audio encoder 128 and user generated metadata encoder 130.

Thus, during rendering, rendering engine 120 generates the standard audio, video and text streams. The standard audio, video and text streams are encoded by encoders 126-130. The encoded streams are provided to file writer component 132 in renderer 104. File writer 132 outputs multimedia file 106 which illustratively includes a video output stream 134, an audio output stream 136, and a title output stream 138.

Content analysis engine 121 also receives the source tracks from editor 102 as well as any desired data (which might be helpful in performing content analysis) from rendering engine 120. Content analysis engine 121 performs content analysis on the inputs and generates a content-based index stream that is provided to content-based index stream encoder 124. Encoder 124 encodes the stream and provides the encoded content-based index stream 140 to file writer 132, which writes it into multimedia file 106. In another embodiment, the content-based index stream 140 is separate from the remainder of multimedia file 106, but corresponds to it and is provided along with it.

It will also be noted that content-based index stream 140 may be provided to a user before being provided to file writer 132. In this way, the content-based index stream can be edited prior to it being incorporated into multimedia file 106. This allows a user to correct speech recognition errors and provide a more user-guided index.

In any case, in order to embed the content-based index stream in the multimedia file 106, it should be noted that most common multimedia container formats, such as ASF, MPG, MP4, MP3, OGG, and WAV support embedding of custom format streams. Therefore, a custom content-based index stream is illustratively defined and is used to store the content-based index stream 140 within the multimedia file 106. A search engine can then detect the presence of a content-based index stream by searching for a stream with the custom content-based index stream format. If such a stream is detected, then the information in the content-based index stream can be used for content-based retrieval.

It can be seen from FIG. 1 that the content-based index stream 140 is illustratively generated prior to encoding and contains information useful for content-based search and retrieval of the multimedia file 106. The content-based index stream can illustratively be in a format that is not necessarily efficient for content searching. In that case, a content-based searchable index can be generated from the content-based index stream 140 in a subsequent processing step (described below). However, in another embodiment, content-based index stream 140 can be in a format that is efficient for searching and can therefore be, itself, a content-based searchable index.

Figure 2:
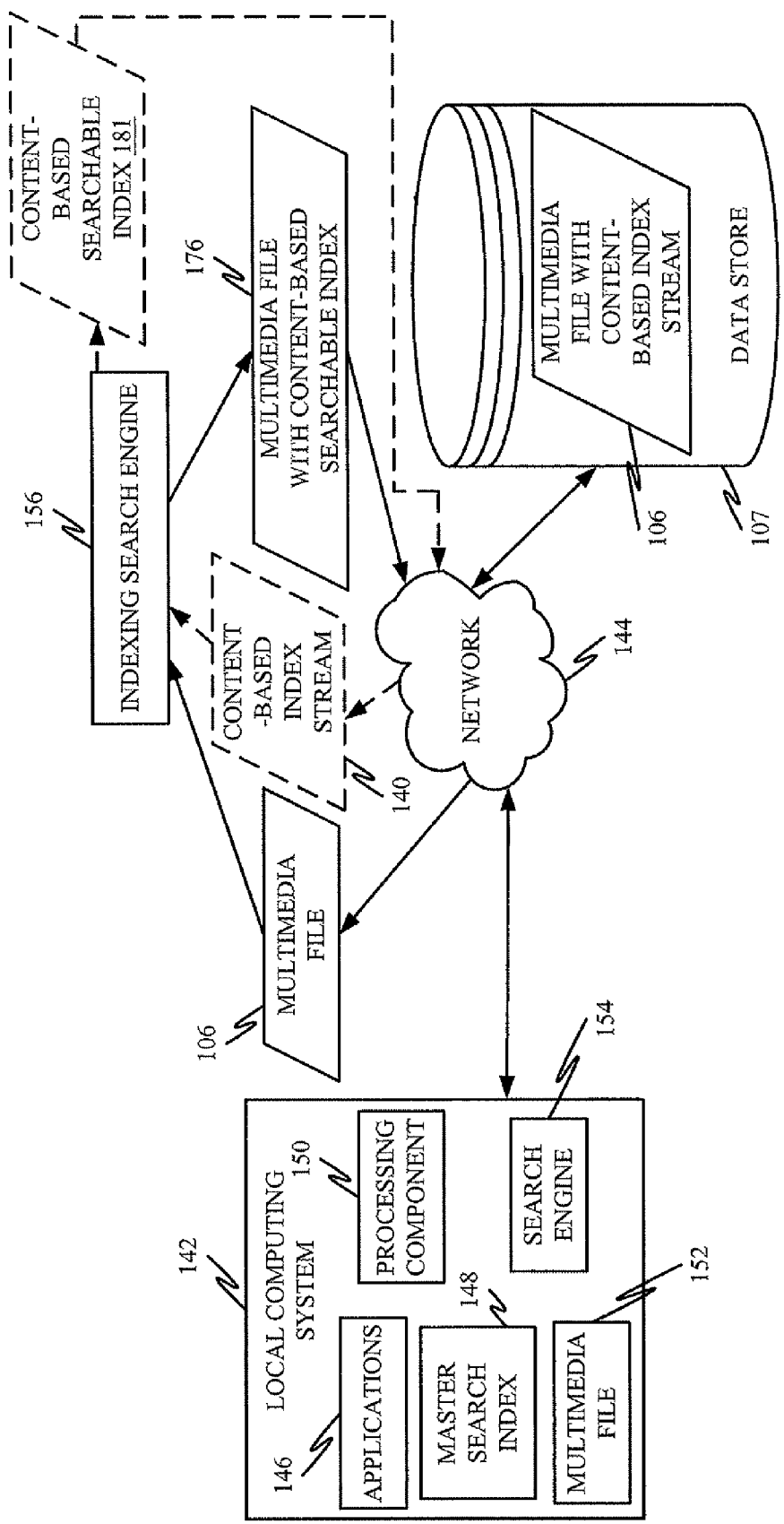
FIG. 2 is a flow diagram illustrating one embodiment of the overall operation of the system shown in FIG. 1.

In any case, FIG. 2 is a block diagram illustrating one illustrative system in which multimedia file 106 can be indexed and used. FIG. 2 shows that a local computing system 142 is coupled to multimedia file 106 through a network 144. FIG. 2 also shows that local computing system 142 includes applications 146, a master search index 148, processing component 150, a second multimedia file 152 and a search engine 154. The system of FIG. 2 also shows a separate indexing search engine 156 which can be used to operate on the content-based index stream (when it is not in a format that is efficiently searchable) to generate a content-based searchable index corresponding to the multimedia file 106, as is discussed in greater detail below. System 100 of FIG. 1 can be embodied in processing component 150 in FIG. 2 or at another location in FIG. 2, or at a location not specifically shown in FIG. 2.

Figure 3:
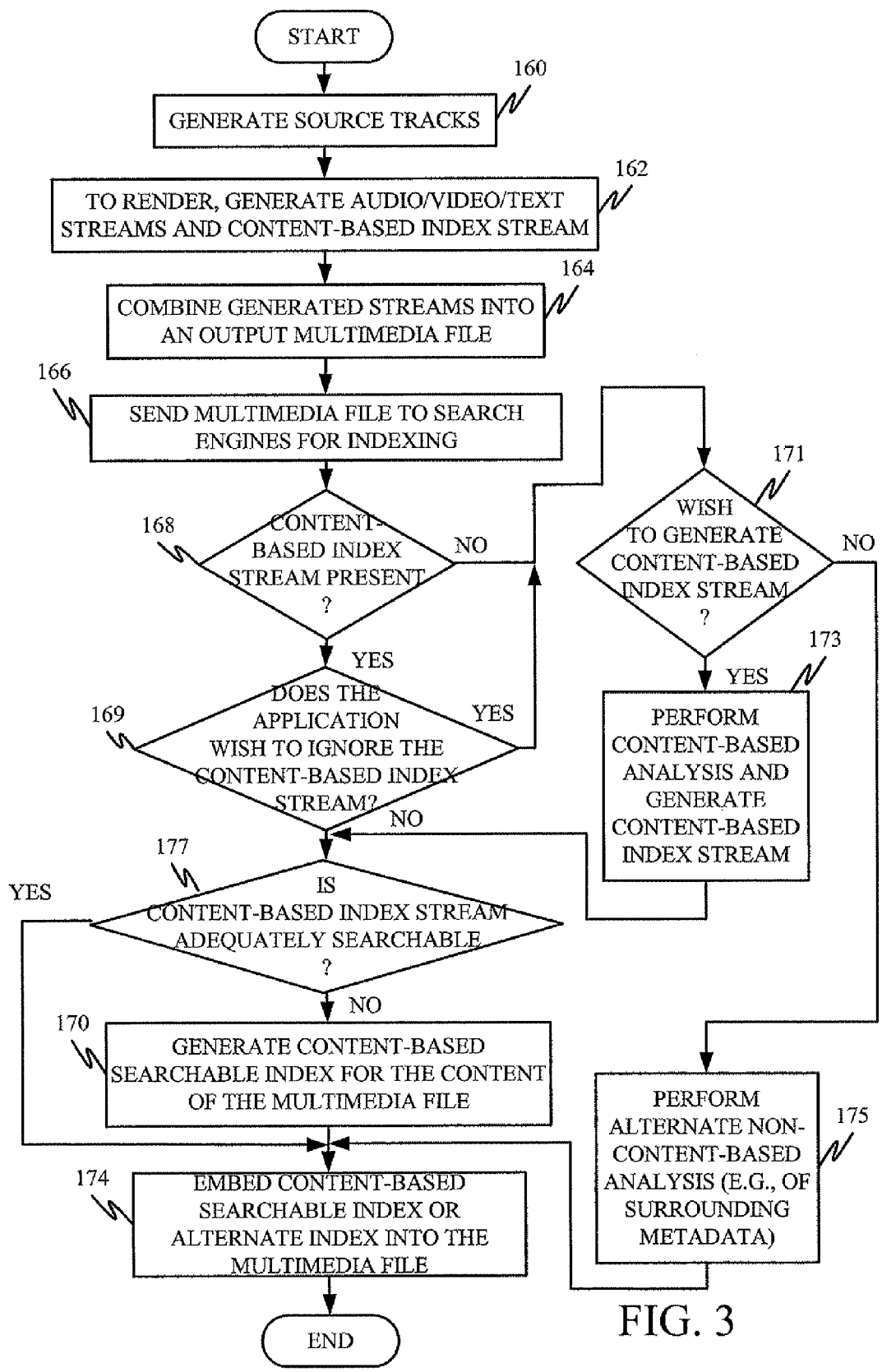
FIG. 3 illustrates a plurality of exemplary content-based index streams.

FIG. 3 is a flow diagram illustrating the operation of rendering system 100 shown in FIG. 1 and of the indexing system shown in FIG. 2. FIGS. 1-3 will now be described in conjunction with one another. The source tracks 108-118 are first provided to render 104 through editor 102. Generating the source tracks and providing them to renderer 104 is indicated by block 160 in FIG. 3. Rendering engine 120 in renderer 104 then renders the various streams, such as audio, video and user generated metadata (e.g., text) streams. Content analysis engine 121 analyzes content of the source tracks and generates, the content-based index stream. This is indicated by block 162 in FIG. 3. The streams are then encoded by encoders 126-130 and content-based index stream encoder 124 and the encoded streams are then combined by file writer 132 to obtain output multimedia file 106. This is indicated by block 164 in FIG. 3. In the embodiment shown in FIG. 2, multimedia file 106 is then stored in, for example, a data store 107 that is accessible by local computing system 142. It will be noted that in the embodiment shown in FIG. 2, data store 107 is accessible by local computing system 142 over network 144. Of course, multimedia file 106 could be stored on a data store local to computing system 142 as well.

In any case, once multimedia file 106 has been generated with the conventional output streams 134, 136 and 138, along with the content-based index stream 140, it can be sent to an indexing search engine, such as engine 156 for content-based indexing. Of course, where content-based index stream 140 is sufficient for searching, no further index needs to be generated. However, the present discussion proceeds with respect to generating a content-based searchable index from content-based index stream 140. Sending the stream to engine 156 for content-based indexing is indicated by block 166 in FIG. 3. Engine 156 first determines whether the content-based index stream 140 is present in multimedia file 106. This is indicated by block 168 in FIG. 3. It may be that engine 156 does not wish to rely on stream 140, but instead wishes to generate its own content-based index stream. For instance, engines 121 that generate the content-based index stream can illustratively sign them. If they are deemed trusted engines 121, by search engine 156, then search engine 156 can use the content-based index stream based on the signature. However, if engine 121 is not a trusted engine, the stream may be susceptible to surreptitious spamming techniques, and search engine 156 can ignore it and generate its own content-based index stream. Determining whether engine 156 ignores the stream is indicated by block 169 in FIG. 3. If it does ignore the stream, engine 156 then determines whether it wishes to perform content-based analysis and generate its own content-based index stream, as indicated by block 171. If engine 156 decides to generate its own content-based index stream, this is performed at block 173. If it does not decide to generate its own content-based index stream, then it performs alternate indexing, such as non-content-based analysis of surrounding metadata. This is indicated by block 175. The alternate indexing is embedded into multimedia file 106 at block 174.

If either the content-based index stream is trusted by engine 156 (at block 169) or is generated by engine 156 (at block 173), engine 156 determines whether the content-based index stream is adequate for searching. This is indicated by block 177. If so, it is embedded as the content-based searchable index in file 106, as indicated by block 174. Otherwise, engine 156 generates the content-based searchable index from the content-based index stream, as indicated by block 170, and embeds it in multimedia file 106 to obtain multimedia file 176, as indicated by block 174.

File 176 can be stored again on data store 107, or in any other desired location.

FIG. 2 also shows that the content-based index stream 140 and content-based searchable index 181 can be provided as being separately downloadable. Therefore, a mobile phone user, for instance, might only download the content-based searchable index 181 rather than the entire multimedia file 106 or 176. This allows the user to still search content of file 106 or 176, and only requires downloading the content of the file when actually accessing the content (such as when viewing it). Similarly, a stub-multimedia file can be generated that contains no audio/video streams but only the content-based index stream or content-based searchable index. This allows users to discover the content of file 106 or 176 without having access to the actual multimedia content. Thus, the content can be searched but not be made available for use by others.

Figure 4:
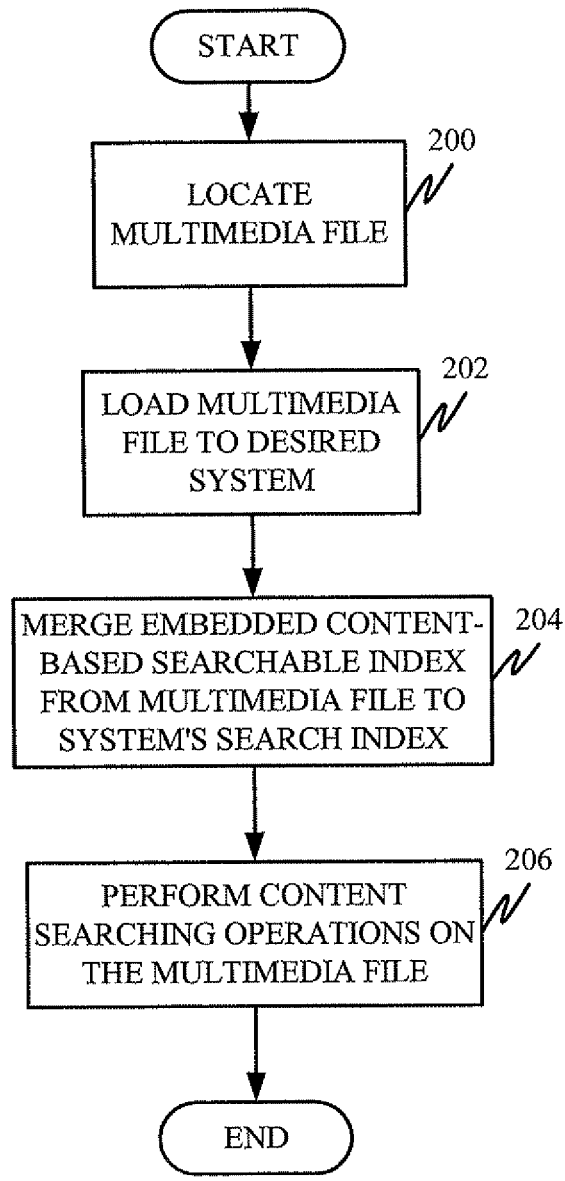
FIGS. 4-6 illustrate a plurality of exemplary content-based index streams in greater detail.

Once multimedia file 106 has a content-based searchable index generated for it and embedded in it or stored along with it, it is ready to be accessed by computing system 142, or any other computing system that can perform search and retrieval tasks on it. FIG. 4 is a flow diagram illustrating one embodiment in which computing system 142 accesses multimedia file 106. For the sake of the present discussion, assume that local computing system 142 is a computer or other computing device with a multimedia editor in processing component 150. Assume also, for the sake of the present discussion, that a user using local computing system 142 has generated a second multimedia file 152 which has content-based index stream 140 embedded in it, but where stream 140 is not in a format that makes searching expedient, and for which automatic content-based analysis and indexing has not been performed so that there is no content-based searchable index, as yet.

Computing system 142 also includes search engine 154 which can be used to search and retrieve content over network 144, or to search applications 146, multimedia file 152, and other components on computing system 142. When searching for software or other content on computing system 142, search engine 154 illustratively searches a master search index 148 which is a searchable index of content stored on computing system 142. In that way, search engine 154 can locate content without touching individual applications 146 or multimedia files 152 or other software.

In the embodiment discussed with respect to FIGS. 2 and 4, it is assumed that a user has generated the second multimedia file 152 and wishes to add multimedia content to it. Therefore, the user uses computing system 142, and specifically search engine 154, to locate other multimedia content of interest, such as multimedia file 176. This is indicated by block 200 in FIG. 4. System 142 then uses search engine 154 to download multimedia file 176. This is indicated by block 202 in FIG. 4. Processing component 150 detects the content-based searchable index embedded in file 176 and loads that content-based searchable index into master search index 148 (assuming, of course, that the content-based searchable index was created by a trusted engine). In this way, multimedia file 176 is now content-searchable on local computing system 142 without requiring any intensive content analysis processing of the content of multimedia file 176. Merging the embedded content-based searchable index from multimedia file 176 to the system's master search index 148 is indicated by block 204 in FIG. 4.

Processing component 150 can then perform any number of different content searching operations on multimedia file 176 to locate multimedia content which the user wishes to merge with, or add to, multimedia file 152, which the user has already created. Performing the content searching operations on multimedia file 176 is indicated by block 206 in FIG. 4.

Figure 5:
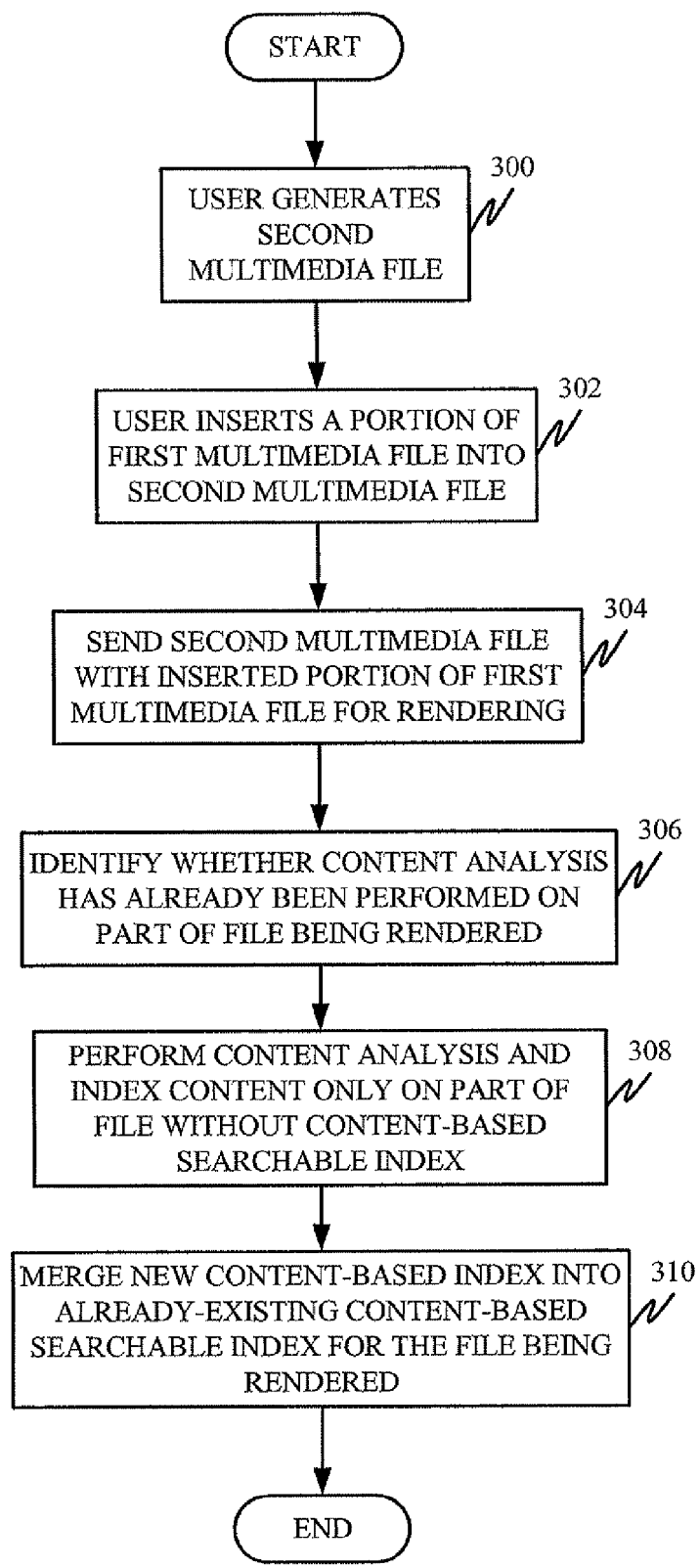

FIG. 5 is a flow diagram illustrating how a user of local computing system 142 can insert a portion of the content of multimedia file 176, which has been downloaded to system 142, into the user's multimedia file 152. The user generating multimedia file 152 is indicated by block 300 in FIG. 5. The user then modifies multimedia file 152 by performing a content-based search on multimedia file 176, identifying content the user wishes to insert in multimedia file 152, and inserting that content into multimedia file 152. This is indicated by block 302 in FIG. 5. This creates a modified version of multimedia file 152, part of which has had a content-based searchable index generated for it (the part just merged from multimedia file 176) and part of which either has only the content-based index stream associated with it, or has no content-based index stream associated with it, but in either case has not had a content-based searchable index generated for it (the original multimedia file 152).

The modified multimedia file 152 is then sent to a renderer 104 in processing component 150 of computing system 142 where the modified multimedia file 152 is rendered. This is indicated by block 304. During the rendering process, as with the creation of multimedia file 106, content analysis engine 121 identifies whether content analysis has already been performed on parts of the file 152 being rendered. This is indicated by block 306. Of course, content analysis engine 121 will find that the part of the content in modified file 152 that comes from multimedia file 176 already has a content-based searchable index associated with it, and that index has been loaded into master search index 148. However, content analysis engine 121 will also find that the remainder of multimedia file 152 only has the content-based index stream 140 associated with it, or has no content-based index stream but in any case it has no corresponding content-based searchable index. This can be determined in any number of ways. For instance, the content of file 176 can be marked to indicate that it has already been indexed.

If the portion of multimedia file 152 has no content-based index stream (or an untrusted one), then content analysis engine 121 generates the content-based index stream using content analysis for only that portion of file 152 that has none. Search engine 154 is also illustratively an indexing search engine similar to engine 156. Therefore, engine 154 performs content-based analysis on the original portion of multimedia file 152 generates a content-based searchable index for the content of only that part of file 152 that does not yet have a content-based searchable index. This is indicated by block 308 in FIG. 5.

Once the file has been indexed, the new content-based searchable index is merged into the already-existing content-based searchable index for the modified multimedia file 152 being rendered. This is indicated by block 310 in FIG. 5. The new content-based searchable index can also be added to master search index 148 so that the modified multimedia file 152 is completely content searchable by component 150 of computing system 142.

Figure 6:
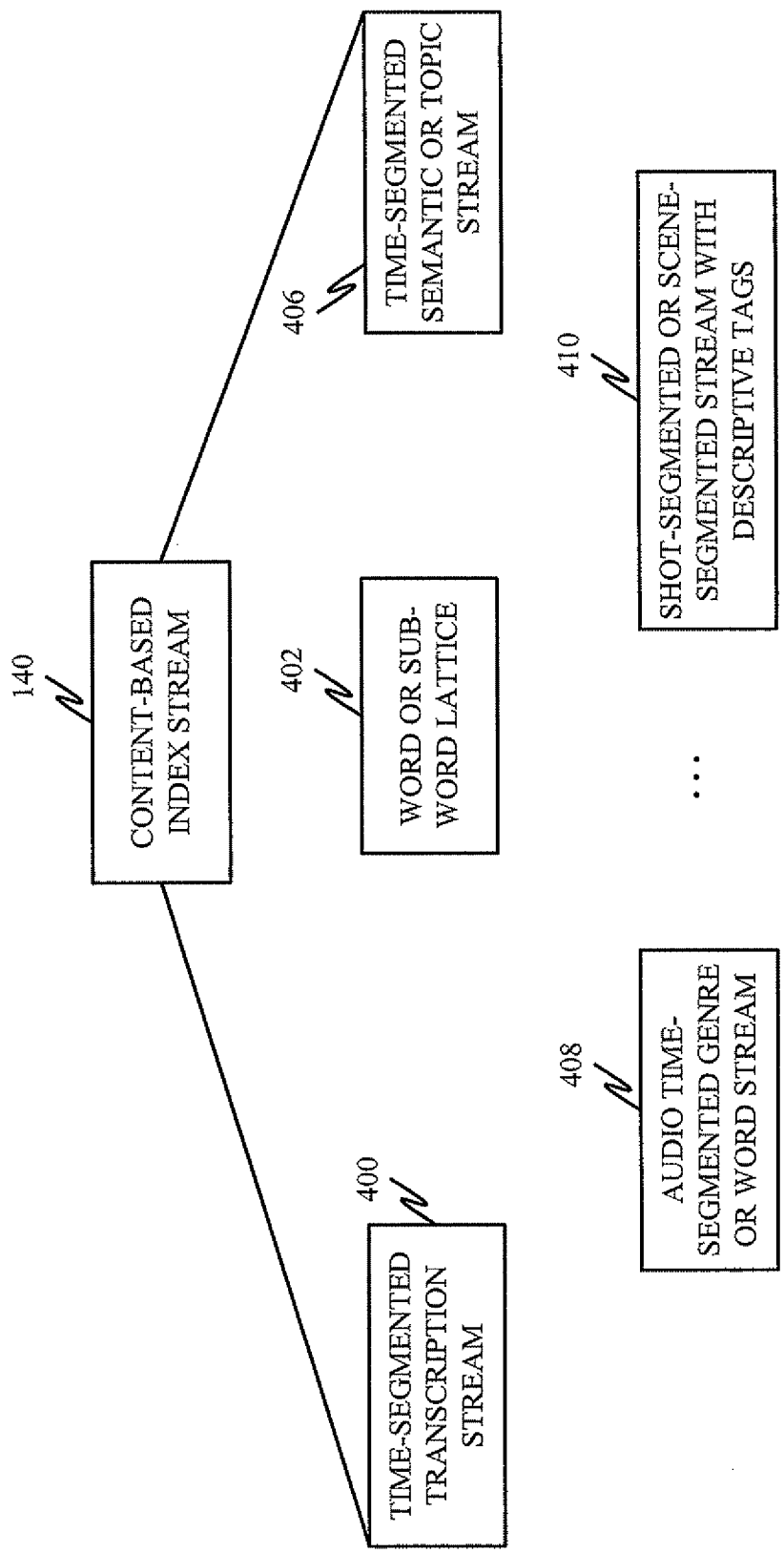

The content-based index stream 140 generated by rendering engine 120 is now described in greater detail. FIG. 6 illustrates a plurality of different embodiments for content-based index stream 140. One or more of the content-based index streams shown in FIG. 6, or different index streams, could be used and those shown are shown for the sake of example only. FIG. 6 shows that content-based index stream 140 can be a time-segmented transcription stream 400, a word or sub-word lattice 402, a time-segmented semantic or topic stream 406, an audio time-segmented genre of word stream 408, or a shot-segmented or scene-segmented stream with descriptive tags 410.

The first three exemplary index streams 400-406 are illustratively generated by a speech recognition system. The audio stream 408 is illustratively generated by an audio recognizer and the stream 410 is illustratively generated by a video processor or image recognizer.

Time-segmented transcription stream 400 is illustratively a list of words or word hypotheses corresponding to time frames in a speech or audio signal in multimedia file 106. Word or sub-word lattice stream 402 is illustratively the word or sub-word lattice output by a speech recognition engine when recognizing an audio source track. The word lattice, of course, is a lattice of potentially recognized words and the sub-word lattice is a lattice of potentially recognized sub-word units, such as phonemes.

Time-segmented semantic or topic stream 406 is a list of semantic labels, or topics, identified for different time segments in the audio stream. The semantic analysis can be, for example, the result of semantic analysis of the audio and video stream, or other semantic information generated by a natural language processor, or other semantic processing system. The topics can also be generated by a natural language processor or other system.

The time-segmented genre or word stream 408 is generated by an audio processor and identifies a genre associated with music or words in music. The shot or scene-segmented stream with descriptive tags 410 is illustratively generated by a video processor that identifies video shots or scenes and includes descriptive textual tags associated with those scenes.

It will be noted that any of these streams can be stored in either forward or reverse format. For example, word or sub-word lattices can be either stored forward or inverted. The same is true for other index streams generated such as a face index stream generated from video processing, etc.

FIG. 7 is a more detailed illustration of an exemplary format for a time-segmented index stream. FIG. 8 illustrates an example of a segment from a time-segmented transcription index stream. It can be seen in FIG. 8 that each time segment is indicated by a start time and an end time. A sequence of words is identified with a word label at each of a plurality of different times between the start and end times. The words are illustratively word hypotheses recognized by a speech recognizer during content-based analysis.

Figures 9, 10:
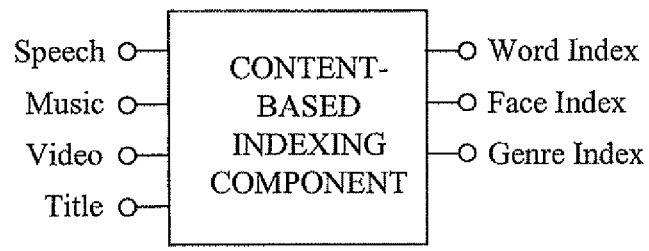
FIG. 9 is a flow diagram illustrating another embodiment of the operation of the system shown in FIG. 7.
FIG. 10 illustrates one embodiment of a content indexing component.

FIG. 9 is also an example of a time-segmented transcription index stream. The stream shown in FIG. 9 is similar to that shown in FIG. 8 except that it also includes a probability score which indicates how confident the speech recognizer is in its recognition of the associated word label at each time.

FIG. 10 illustrates another embodiment for generating a content-based index stream. The embodiment shown in FIG. 10 employs a multimedia processing system that generates a graph of filters to pipeline processing of multimedia content. In one embodiment (such as that shown in FIG. 1), a filter object is created that takes the individual source tracks as inputs and generates a set of content-based index streams suitable for embedding in the multimedia file 106. The actual technology used to perform the content analysis is not important for purposes of the present invention. However, FIG. 10 shows that content indexing component 400 is a more specific embodiment of content analysis engine 121 in FIG. 1 and receives speech, music, video and title information and generates a word index (that indexes spoken words), a face index (that indexes facial images) and a genre index (that indexes genre). Of course, other indexes can be generated.

It can thus be seen that, in accordance with one embodiment, an automatically generated custom coded stream that contains information useful for content-based search and retrieval of a multimedia file is referred to as a content-based index stream. The content-based index stream is automatically generated during the rendering process using content-based analysis algorithms. This provides a number of advantages.

First, since indexing is performed once by the content creator, in rendering, a third party search engine does not need to perform computationally expensive indexing in order to search the content. Thus, the cost of indexing is distributed across all content creators rather than placed solely on the search engine provider.

In addition, by integrating indexing into the rendering stage, and specifically before encoding, content-based analysis can be performed on a cleaner source media. For instance, in a news broadcast with background music, speech recognition can be performed on the clean speech track before it is mixed with the background music. This results in more accurate speech recognition and thus a higher quality index. Similarly, video scene analysis can be performed on original, raw video content before any obfuscating visual effects are applied to it.

In addition, content-based indexing can take advantage of multiple sources to improve index quality and retrieval accuracy. For example, a speech recognizer may use key words in text source tracks to dynamically adapt its vocabulary and language models in order to improve recognition accuracy. By way of example, assume that the text source tracks have to do with a specific location, such as Tunisia. The speech recognizer can dynamically adapt its vocabulary and language models to preferentially recognize words associated with Tunisia.

Many content analysis algorithms use segmentation (that is, breaking a continuous track into individual homogeneous segments) to achieve more robust indexes. In many cases, a content editor defines clip boundaries during the editing process. In accordance with one embodiment, clip boundary information is thus available during the rendering process and can be used by the content-analysis components as prior information about segment boundaries. A video analysis component may thus benefit by using clip boundaries defined by a content editor as the scene boundaries for video analysis.

Further, by integrating content-analysis directly into the rendering process, the entire task of content-based indexing becomes transparent to the user. This means that the technology may illustratively be easier to use and more commonly used because it requires little user interaction. Also, since indexes are part of the resulting multimedia file, copies of the same file will automatically include the index. This means that if a user downloads a copy of an already-indexed file, the user need not re-index it in order to make it searchable.

In addition, if a user decides to create a new multimedia file by combining a number of individual multimedia files, index stream generation and indexing only needs to be performed for any source multimedia files that are not already indexed. Thus, in an extreme case where all source multimedia content already contains content-based searchable indexes, indexing of the new combined multimedia file will simply require merging of the source multimedia file indexes, and no further indexing needs to be performed.

The present system can also be seen to increase exposure of certain content. Since content-based indexing provides a richer representation of the content of a file, it is more likely that a content-based index file will be found by an interested user through a search engine. This means greater exposure of multimedia content for content creators.

Figure 11:
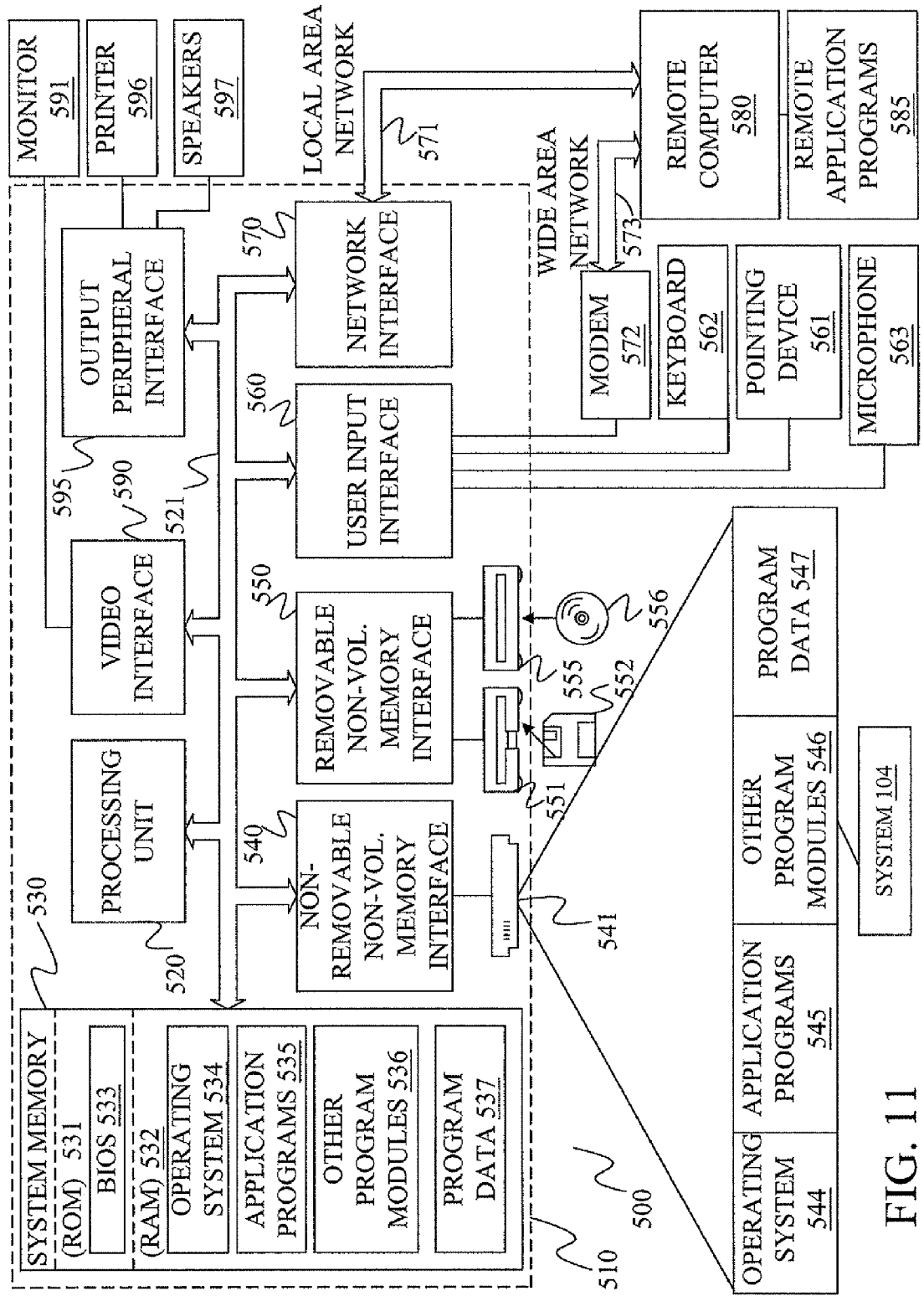
FIG. 11 is a block diagram of an illustrative computing environment.

FIG. 11 illustrates an example of a suitable computing system environment 500 on which embodiments may be implemented. The computing system environment 500 is only one example of a suitable computing environment and is not intended to suggest any limitation as to the scope of use or functionality of the claimed subject matter. Neither should the computing environment 500 be interpreted as having any dependency or requirement relating to any one or combination of components illustrated in the exemplary operating environment 500.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 11, an exemplary system for implementing some embodiments includes a general-purpose computing device in the form of a computer 510. Components of computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 510 typically includes a variety of computer readable media. Computer readable media can be any available media that can be accessed by computer 510 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 11 illustrates operating system 534, application programs 535, other program modules 536, and program data 537.

The computer 510 may also include other removable/non-removable volatile/nonvolatile computer storage media. By way of example only, FIG. 11 illustrates a hard disk drive 541 that reads from or writes to non-removable, nonvolatile magnetic media, a magnetic disk drive 551 that reads from or writes to a removable, nonvolatile magnetic disk 552, and an optical disk drive 155 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 11, provide storage of computer readable instructions, data structures, program modules and other data for the computer 510. In FIG. 11, for example, hard disk drive 541 is illustrated as storing operating system 544, application programs 145, other program modules 546, and program data 547. Note that these components can either be the same as or different from operating system 534, application programs 535, other program modules 536, and program data 537. Operating system 544, application programs 545, other program modules 546 (which can include system 104), and program data 547 are given different numbers here to illustrate that, at a minimum, they are different copies. It will be noted that system 104 can be included other places as well.

A user may enter commands and information into the computer 510 through input devices such as a keyboard 562, a microphone 563, and a pointing device 561, such as a mouse, trackball or touch pad. Other input devices (not shown) may include a joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. In addition to the monitor, computers may also include other peripheral output devices such as speakers 597 and printer 596, which may be connected through an output peripheral interface 595.

The computer 510 is operated in a networked environment using logical connections to one or more remote computers, such as a remote computer 580. The remote computer 580 may be a personal computer, a hand-held device, a server, a router, a network PC, a peer device or other common network node, and typically includes many or all of the elements described above relative to the computer 510. The logical connections depicted in FIG. 11 include a local area network (LAN) 571 and a wide area network (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560, or other appropriate mechanism. In a networked environment, program modules depicted relative to the computer 510, or portions thereof, may be stored in the remote memory storage device. By way of example, and not limitation, FIG. 11 illustrates remote application programs 585 as residing on remote computer 580. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system comprising:
   a rendering component configured to receive a plurality of source tracks;
   a file combining component configured to receive a multimedia file with a first content-based searchable index therein, and to combine the source tracks and multimedia file to obtain a combined file; and
   a content analysis engine configured to generate a content-based index stream only for a portion of the combined file that is without the content-based index, and generate a second content-based searchable index based on the content-based index stream.

2. The computing system of claim 1, wherein the second content-based searchable index is generated based on the content-based index stream only for the portion of the combined file that is without the corresponding content-based index.

3. The computing system of claim 1, wherein the content analysis engine is configured to identify the portion of the combined file that is without the corresponding content-based index.

4. The computing system of claim 3, wherein the content analysis engine is configured to generate the content-based index stream only for the identified portion of the combined file that is without a corresponding content-based index, based on both speech content and non-speech audio content in the identified portion of the combined file.

5. The computing system of claim 1, wherein the content analysis engine is configured to generate the second content-based searchable index based on speech content in the source tracks.

6. The computing system of claim 1, wherein the content analysis engine is configured to generate the second content-based searchable index based on non-speech audio content in the source tracks.

7. The computing system of claim 1, and further comprising a file writer configured to write a combined multimedia file by merging the first and second content-based searchable indices therein.

* * * * *